United States Patent [19]

Buels

[11] 4,321,476

[45] Mar. 23, 1982

[54] BI-DIRECTIONAL WIND POWER GENERATOR

[76] Inventor: Jesse H. Buels, 2810 Gold Ave., El Paso, Tex. 79930

[21] Appl. No.: 162,605

[22] Filed: Jun. 24, 1980

[51] Int. Cl.³ .............................................. F03D 9/02
[52] U.S. Cl. .................................. 290/55; 60/641.12
[58] Field of Search ...................... 290/42, 43, 44, 53, 290/54, 55; 60/398, 641.8, 641.11, 641.12; 416/121 A, 19, 197 A, 196 A; 415/2 A

[56] References Cited

U.S. PATENT DOCUMENTS

| | | | |
|---|---|---|---|
| 264,164 | 9/1882 | Jackson | 290/55 |
| 1,413,861 | 4/1922 | McDowell | 416/197 A |
| 1,786,057 | 12/1930 | Fales | 416/121 A |
| 1,876,595 | 9/1932 | Beldimano | 290/55 |
| 2,218,867 | 10/1940 | Beldimano | 290/55 |
| 3,203,167 | 8/1965 | Green | 60/641 |
| 4,118,636 | 10/1978 | Christian | 60/641 |
| 4,143,992 | 3/1979 | Crook | 290/55 |
| 4,204,126 | 5/1980 | Diggs | 290/55 |

FOREIGN PATENT DOCUMENTS 59852  8/1954  France .......................... 416/121 A

*Primary Examiner*—J. V. Truhe
*Assistant Examiner*—Shelley Wade
*Attorney, Agent, or Firm*—Harvey B. Jacobson

[57] ABSTRACT

A structure designed to be placed in an existing pass in a mountain range comprises a framework having a plurality of individual passageways through which moving air may travel. Each passageway contains a separate wind driven propeller structure which can be operated by air moving through the passageway from either direction. Each end of each passage contains a covering for selectively closing off that passageway. The passageways are laterally aligned in horizontal rows and vertical columns and adjacent each row and column there is one or more semi-cylindrical baffles which are placed to increase the pressure gradient between the inlet and outlet side of each passageway thereby increasing the speed of airflow through the associated passageways. Entrance and exit zones of adjacent passageways are insulated from each other to trap solar radiation in the central zone.

9 Claims, 10 Drawing Figures

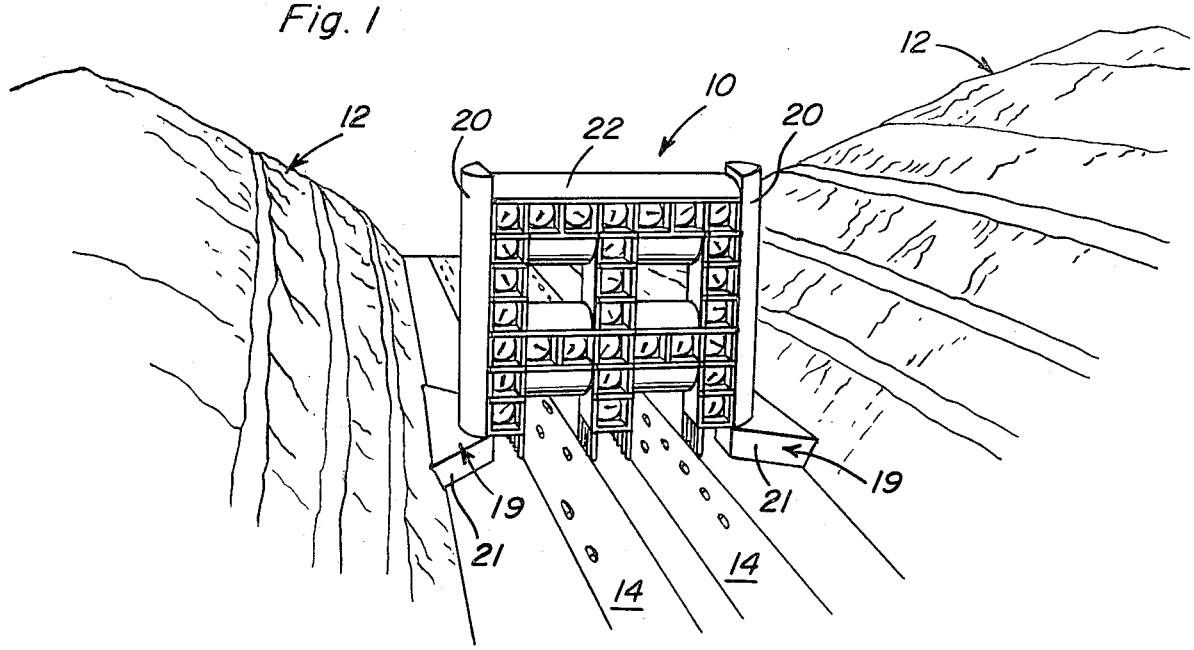
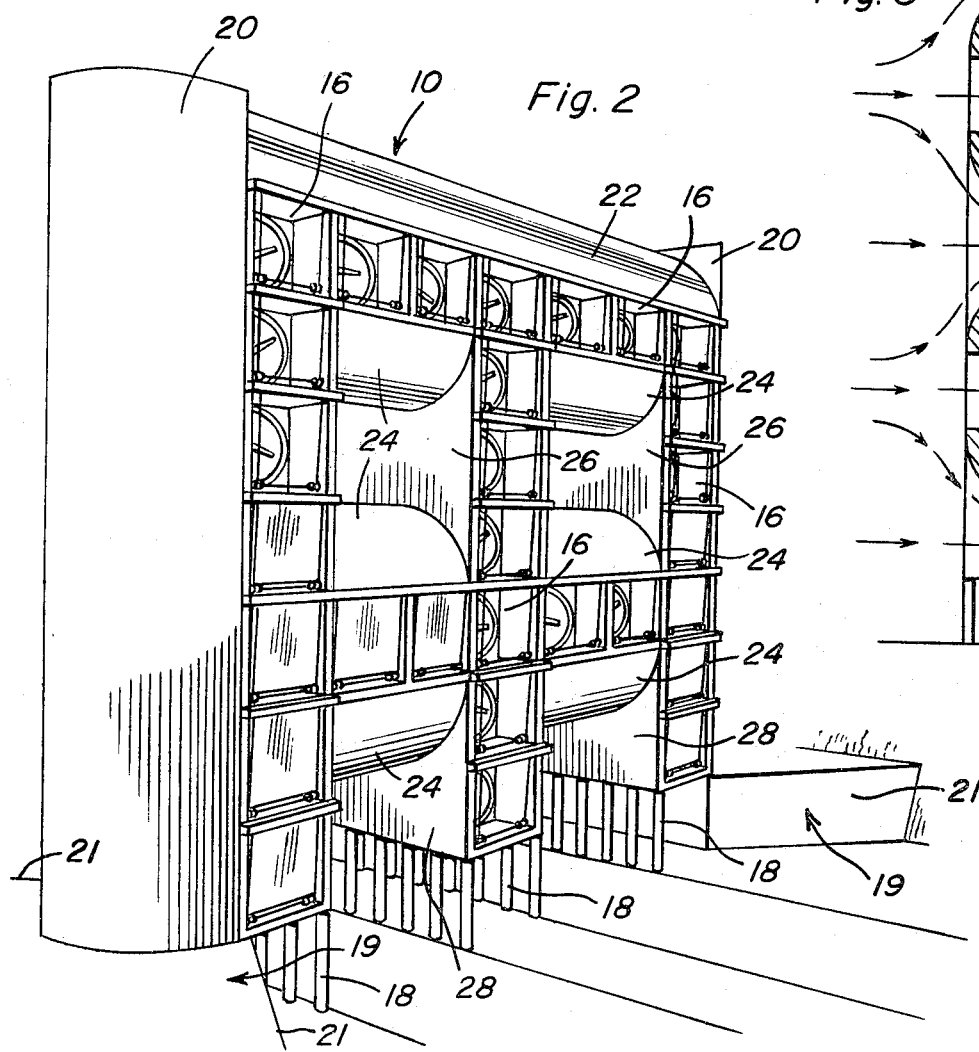
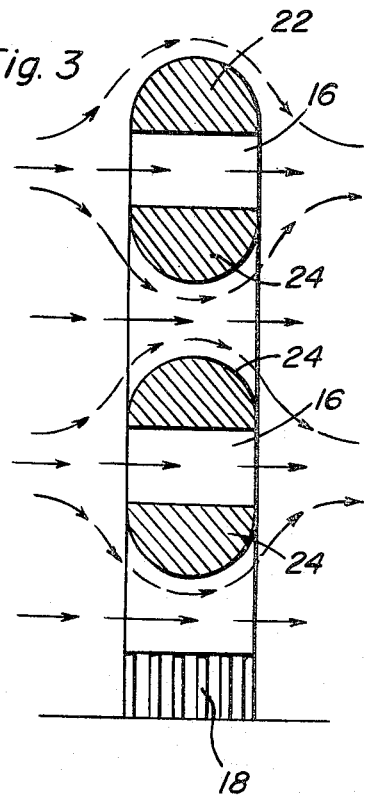

BI-DIRECTIONAL WIND POWER GENERATOR

BACKGROUND OF THE INVENTION

1. Field of the Invention

This invention relates to power conversion systems and especially to such systems which are designed to convert wind power into electrical energy through rotation of a turbine or blade.

2. Discussion of Related Art

The energy crisis which the world is now experiencing is felt by many if not all people. There is no reason to hope that the crisis will be abated in the near future and thus it is necessary to utilize as many sources of energy as are available. One commonly known but relatively little used source of energy is the natural energy created by the wind.

Many devices have been suggested for harnessing wind energy. For instance, U.S. Pat. No. 1,876,595, issued Sept. 13, 1932, to Beldimano, shows a generating apparatus comprising a vertically disposed flexible net, the meshes of which constitute a plurality of juxtaposed apertures in which separate wind wheels are mounted. The space existing between the apertures is covered by solid wall pieces of sheet metal or the like so that no wind can pass uselessly through the net between the individual wheels. U.S. Pat. No. 4,035,658, issued July 12, 1977, to Diggs, shows a wind turbine including a module which encloses four wind turbine units. The face of each unit is composed of a wind directional cowling. The module is mounted on a rotatable platform so as to enable the module to face the wind at all times.

SUMMARY OF THE INVENTION

One object of the present invention is to provide a wind powered generator adapted to be constructed in the opening of a mountain pass so as to take advantage of the winds passing therethrough in either direction.

A further object of the present invention is to provide a wind powered generator which is constructed to generate electricity in response to wind passing through the generator in either one of two directions.

An even still further object of the present invention is to provide a wind powered generator which utilizes small wind driven propellers in order to reduce the probability of damage from high winds.

Yet another still further object of the present invention is to provide a wind powered generator having wind baffles designed to increase the pressure differential across each passageway containing the wind driven propellers.

In accordance with the above objects, the wind powered generator of the present invention comprises a solid framework having a plurality of juxtaposed axial airflow passages which are arranged in vertical columns and horizontal rows. Each of the passageways contains a pair of tandemly mounted propeller blades extending radially in opposite direction from a common shaft. The pitch of each blade is automatically adjusted by wind pressure acting against a spring loaded blade mounting structure so that the speed of rotation of the blade is automatically adjusted. On each end of each passageway, there is mounted a curtain-like device for closing off that passageway when needed, such as when a malfunction occurs to the operative components of that passageway. Also, each passageway has walls which are insulated so that solar radiation impinging upon the individual passageway will heat up the interior thereof thereby causing any air which passes through the passageway to expand increasing the velocity of the air and producing additional power.

Adjacent each vertical or horizontal row of passageways there is at least one semi-cylindrical baffle which deflects oncoming air around the outside of the passageway. These baffles increase the air pressure differential between the windward and leeward regions axially aligned with the passageways at the air intake and air outlet sides to increase the wind speed through the passageway itself.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a wind powered generator built in accordance with the present invention and positioned in a mountain pass.

FIG. 2 is an enlarged perspective view of the wind powered generator of FIG. 1.

FIG. 3 is a schematic view depicting the operation of the semi-cylindrical air deflectors.

DESCRIPTION OF THE PREFERRED EMBODIMENT

Figure 4:
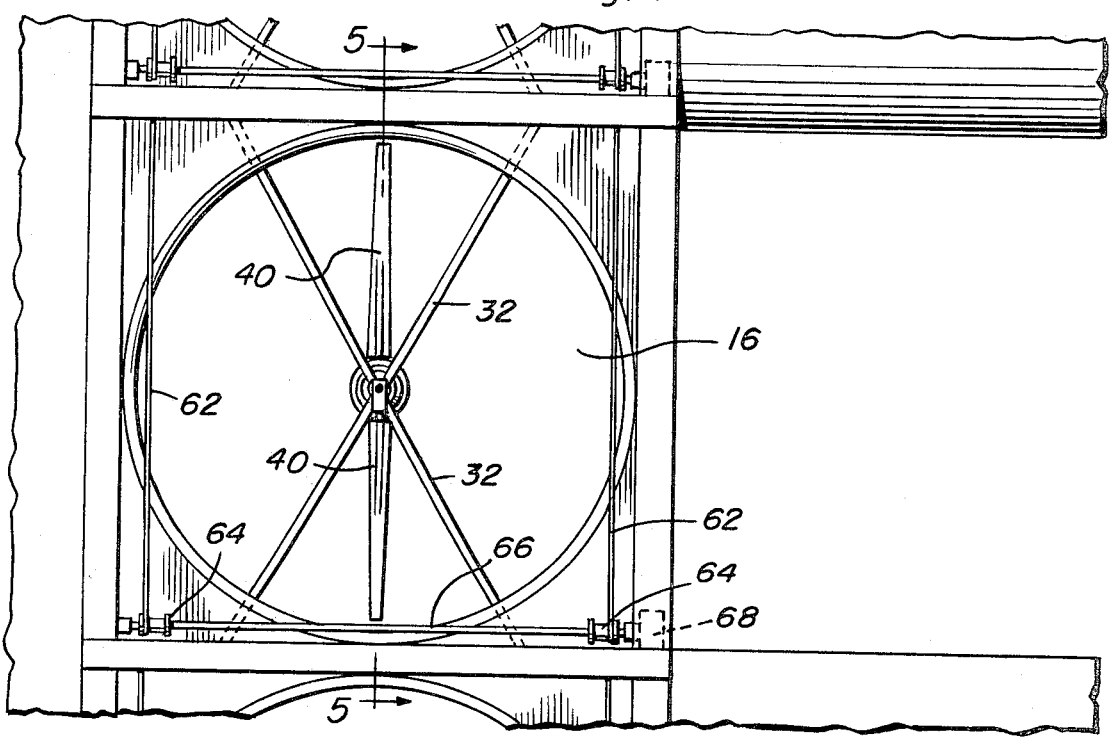
FIG. 4 is a front elevational fragmental view showing one passageway of the wind powered generator.

Now with reference to the drawings, a bi-directional wind powered generator incorporating the principles and concepts of the present invention and generally referred to by the reference numeral 10 will be described in detail.

With particular reference to FIG. 1, it will be seen that device 10 is a gate-like structure for intercepting the power of bi-directional winds in any suitable location. The ideal location for the placement of wind power generator 10 is in the pass generally labeled 12 cut into a mountain for the purpose of allowing a road generally shown at 14 to pass through the mountain. Accordingly, a natural and environmental conformation occurs wherein wind is channeled through the pass 12 in only two directions. Of course, locations with similar bi-directional winds can be found elsewhere around the world.

FIG. 2 depicts the general construction of the wind powered generator 10. The structure comprises a framework made of steel and concrete and having a series of passageways or power cavities 16 which are arranged in three vertical columns and two horizontal rows. The entire structure is built on stilts 18 which are arranged in line with the direction of air movements so that bi-directional winds can sweep under the passageways with a minimum of obstruction to enhance the pressure gradient between the windward and leeward of the lower passageways.

Support sections 19 extend from each side of the device into the adjacent hillside. Each support section has a pair of converging vertical walls 21 which direct airflow toward the center of the device 10. The sections 19 also lend structural rigidity to the device in order to allow it to withstand the broadside pressure of high winds. The sections can be sealed with hollow interiors to act as repair shops or other auxiliary purposes.

Along each side of the structure there is attached a semi-cylindrical baffle plate 20. Baffles 20 divert moving air to the side of the structures thus increasing the pressure gradient from the windward to leeward side of the passageways 16 in the endmost vertical columns. An additional semi-cylindrical baffle 22 is connected to the top of the structure over the top row of passageways in order to increase the air pressure gradient between the windward and leeward of these passageways. Additional, smaller baffle plates 24 are placed adjacent the horizontal rows of passageways 16 in openings 26 which are left in the structure to allow freeflow of wind therethrough. Lower openings 28 formed in the structure also contain the smaller baffles 24 mounted below the lower row of passageways 16.

With reference to FIG. 3, it can be seen that the baffle structure, in this case baffles 22 and 24, cause an increase wind pressure differential from the windward to leeward side of the structure. The baffles deflect air now passing through passageways 16 above and below the passageways. The air speed around the baffles is increased over the ambient air speed thus creating a low pressure zone to the leeward side of the passageways. This low pressure zone in turn causes an increase in air speed of the air passing through the passageways thus providing additional power density for operation of the generating structure positioned within the passageways and to be discussed hereinafter.

With reference to FIGS. 4 through 10, it can be seen that each passageway 16 can be constructed of structural steel girders 29 or any other suitably strong construction material, such as concrete, mentioned above. Braces 32 extend across each passageway and mount generators 34 and propeller shafts 36. Each generator 34 is driven from an associated propeller shaft 36 by either a direct drive arrangement shown in FIGS. 4 and 5 or by use of a pulley and drive belt arrangement shown generally at 38 in FIG. 10 to provide a more favorable drive ratio, or by any other suitable drive arrangement which can provide a desired drive ratio based on the actual dimensions to be used for each passageway. Propeller shaft 36 extends axially of its associated passageway and has attached on each end a propeller blade 40. Each blade 40 is an elongated element having a generally S-shaped cross section and tapers slightly toward its free end. Each blade 40 can be constructed with a length designed to suit desired wind speed conditions, but the length estimated for the propellers should be in accordance with a speed of approximately 600 revolutions per minute. Under normal conditions, it is estimated that the propellers should be approximately 6.75 meters with a 13.5 meter diameter sweep.

Figure 7:
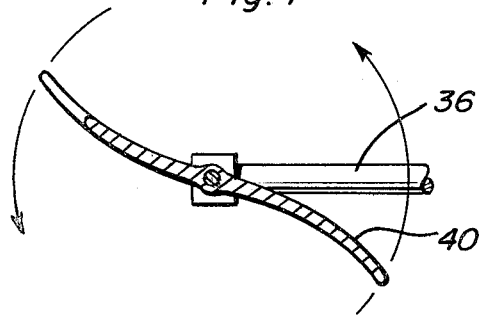
FIG. 7 is a top plan sectional view of one propeller taken substantially along a plane passing through section line 7—7 of FIG. 5.
Figure 9:
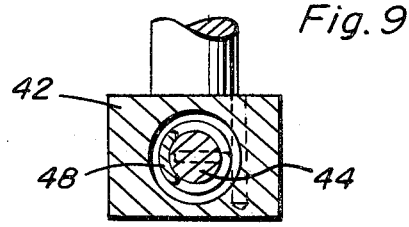
FIG. 9 is a top elevational sectional view taken substantially along a plane passing through section line 9—9 of FIG. 8.
Figure 8:
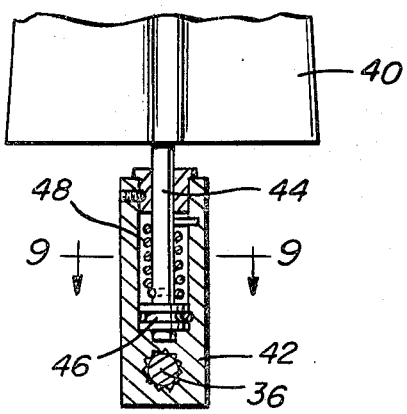
FIG. 8 is a front elevational sectional view of one propeller mounting socket taken substantially along a plane passing through section line 8—8 of FIG. 5.
Figure 10:
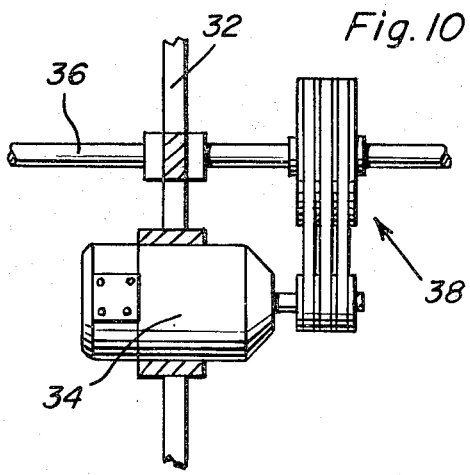
FIG. 10 is an enlarged view showing an alternate connection of one generator to a propeller shaft.

The propellers are mounted in the sockets 42 which are affixed to the ends of shaft 36 and are shown in detail in FIGS. 8 and 9. Propellers 40 are mounted on shafts 44 which are rotatably mounted within the associated socket 42 to allow the propellers to rotate about an axis defined by the associated shaft 44. Each socket 42 contains a stop mechanism 46 and a spring 48 which biases the propeller against the stop mechanism 46. The stop is positioned so that the propeller is biased at the optimum position for the lowest usable air speed. With an increase in air speed, the propeller 40 is displaced rotatably as shown in FIG. 7 to provide automatic pitch adjustment for the blade in order that the blade and propeller shaft 36 will not spin beyond their limits of endurance. The blades 40 are designed only for an optimum propeller pitch setting. Correct frequency of rotation would be controlled by increasing or decreasing field current of the alternator 34 by the proper amount. Propeller rotation would reverse with wind direction reversal, but since the field should be excited externally with a transistorized source, it can be controlled easily. A voltage regulation system might also be necessary to prevent the output voltage from generators 34 from becoming excessive. Synchronous generators might also be used if desired.

Power storage in the form of a waterhead or hydrogen and oxygen gas from electrolysis could be used during times when excess power production is available. Generally, the most efficient use of the wind power would be by the generation of commercial power that can be fed directly into a power grid.

At times, it may be necessary to close off individual passageways 16 when the propeller or generator components therein are defective or when it is desired to reduce the over-all power generation of the system. In these instances, shade-like coverings 50 can be drawn on either or both ends of each passageway 16 as can be seen most clearly with respect to FIGS. 4, 5 and 6. Each covering comprises a fabric 52 rolled on an elongated reel 54 which is contained within an offset housing member 56 disposed at the top of each end of the passageway 16. A stiff bar 60 extends through the free end of each fabric section 52 and has its ends connected to control lines 62. By pulling on the control lines, the material 52 is unrolled from the enlongated reel 54 to cover the associated opening. The opposite end of each line 62 is wound upon reel 64 which are mounted on a lower drive rod 66. Drive rods 66 are connected to spring loaded tension drives 68. The spring tension of drive 68 together with the weight of bar 60 causes the material 52 to unroll covering the associated opening. In order to roll the material back onto the reel 54, a drive motor 70 is attached to each reel 54 and causes the reel to rewind the fabric. The shade mechanisms 50 can be controlled to operate automatically in the event of a malfunction occuring with the blades 40 or generators 34 or any support structure connected thereto. If it is elected not to use the fabric roll assembly, it would possibly be necessary to feather the propellers 40 when needed by remote control, also to exercise pitch control of blades 40 by remote control.

Additional features of the invention include masking rings 72 which comprise solid plate-like structures having circular openings formed therein for directing air passing through the passageways 16 directly to the blades 40. A masking ring 72 is provided on each side of each passageway 16 and spaced from the ends of the passageways in a position relatively close to the blades 40.

Figure 5:
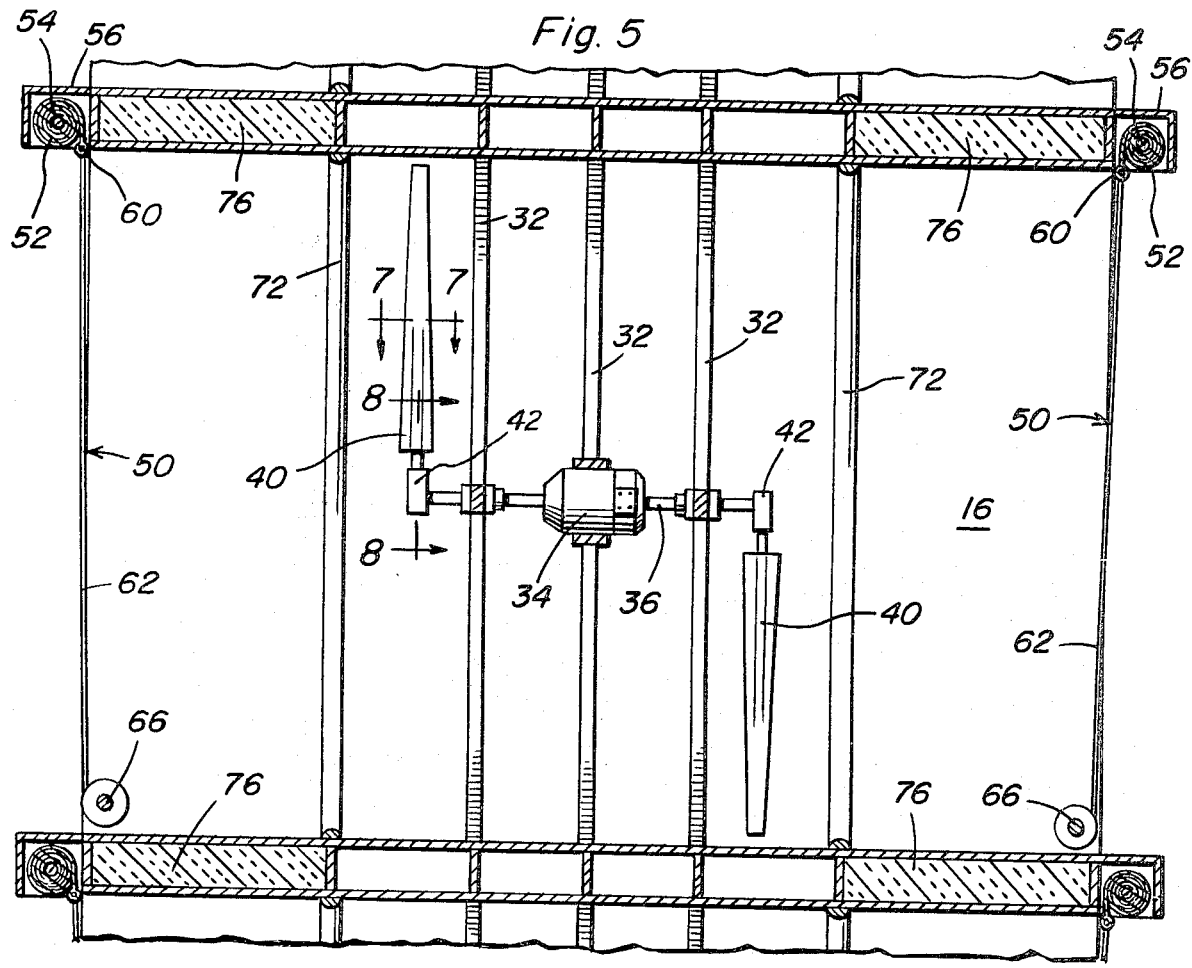
FIG. 5 is a side elevational sectional view taken substantially along a plane passing through section line 5—5 of FIG. 4.
Figure 6:
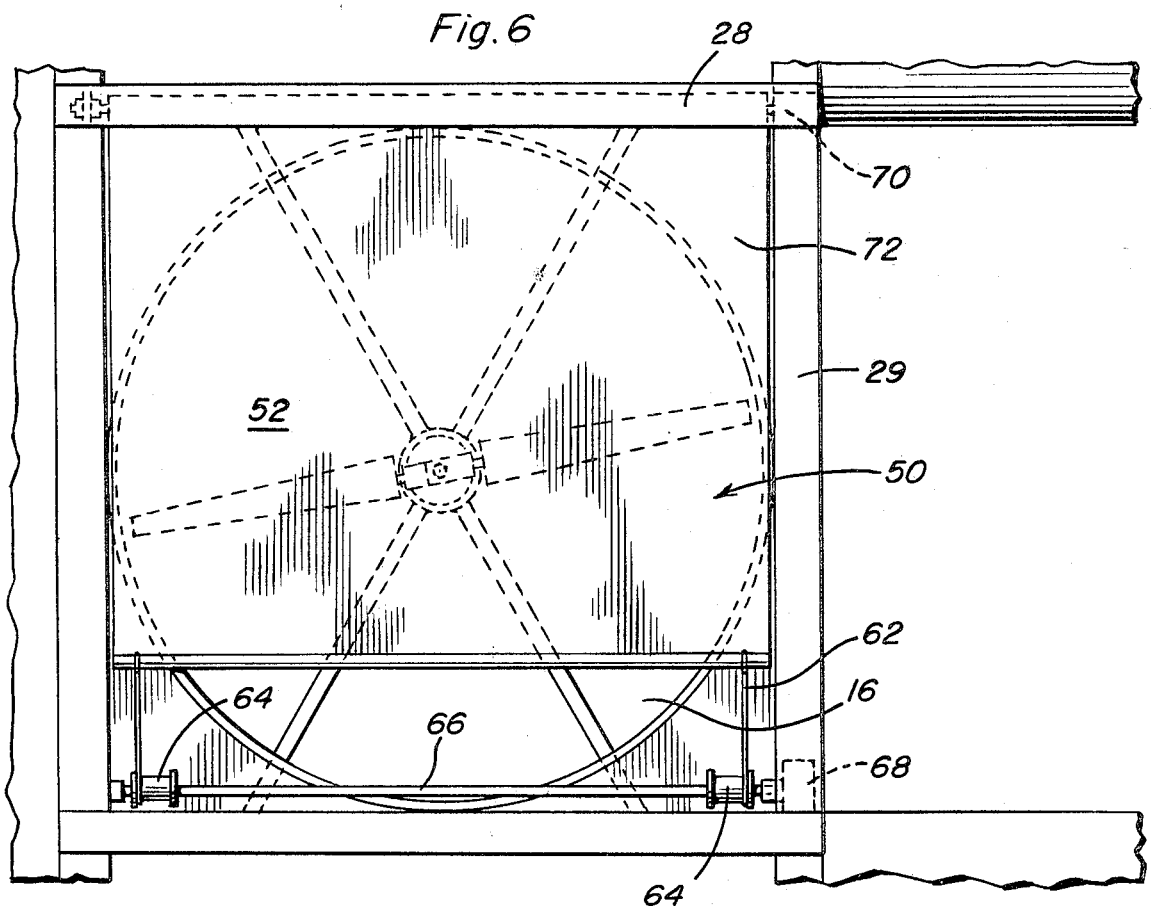
FIG. 6 is a front elevational fragmental view showing the passageway of FIG. 5 with one curtain being drawn across the front of a passageway.

Furthermore, since on a bright day, the generating structure 10 would be heated significantly by the sun's rays, it is possible to take advantage of the solar radiation to cause expansion of the air flowing through passageways 16, thus increasing the speed of the airflow. With reference to FIG. 5, it can be seen that insulation designated by the numeral 76 is disposed between adjacent passageways 16 in the area between masking ring 72 and the openings of the passageways on each side. This should allow some heat expansion of the air to take place inside the center cavity mounting the blades and generator structure, while the insulation prevents the heat from being radiated out of the passageways. This should allow some heat expansion of the air to take place within the passageways and the expanding air would aid power production.

Considering each passageway 16 to be 15 meters wide and 15 meters high, and assuming that propeller blade 40 to have a length at 6.75 meters with a 13.5 meter diameter sweep, in a 30 km/h wind, the power density through each passageway should be approximately 164,493 watts. Converting this power to electricity at 50% efficiency, the result is a production of 82,246.5 watts per passageway. This translates into a total power output of 2,385,148.5 watts for all 29 of the passageways.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:
1. A bi-directional wind power generating structure comprising:
    a vertically extending framework having a plurality of individual passageways formed therein;
    a generating structure mounted in each of said passageways, said generating structure comprising a propeller shaft extending axially within the associated passageway and propeller blades mounted on said propeller shaft, said propeller blades being mounted to the associated propeller shaft through a spring loaded pitch control means for automatically adjusting the pitch of said propellers in response to air speeds; and
    deflector means associated with said passageways for deflecting oncoming air in a direction to increase the wind pressure gradient from the windward to leeward side of the passageways, said generating structure being positioned in a central zone of the associated passageway, and further including entrance and exit zones positioned on opposite sides of said central zone, said entrance and exit zones of adjacent passageways being insulated from each other to trap solar radiation in said central zone.

2. The invention as defined in claim 1 wherein said entrance and exit zones are separated from said central zone by masking rings comprising solid partitions having circular openings formed in the center thereof.

3. A wind power generating structure comprising: a fixed vertical framework having a plurality of axial flow-through passageways formed therein, bladed turbine means mounted within each of the passageways for producing power in response to axial flow of air through the passageways, baffle means mounted by the framework in framing relation to the passageways to form entrance and exit zones at opposite axial ends of the passageways, and insulation means mounted by the framework between the entrance and exit zones of adjacent passageways for entrapping solar energy within the passageways.

4. The invention as defined in claim 3 wherein said baffle means includes a semi-cylindrical baffle extending laterally away from the associated passageway.

5. The invention as defined in claim 4 wherein said passageways are aligned in vertical columns and horizontal rows with a spacing between certain of said rows and columns to accommodate a plurality of said semi-cylindrical baffles.

6. The invention as defined in claim 3 and further including closure means attached to each end of each passageway for closing off the associated passageway.

7. The invention as defined in claim 6 wherein said closure means includes a shade device comprising material rolled onto a reel, said material being displaceable over an opening of the associated passageway.

8. The invention as defined in claim 7 wherein said rolled material is disposed at the top of the associated opening, and further including cables attached to a free end of said material, said cables extending across the associated opening, a spool means attached to each opening for rolling said cables to displace the associated shade material across the associated opening.

9. The invention as defined in claim 3 wherein said structure is positioned in a pass formed in a mountain so as to allow only bi-directional winds to encounter said structure.

* * * * *